United States Patent [19]
Fulbert et al.

[11] Patent Number: 5,754,333
[45] Date of Patent: May 19, 1998

[54] MICROLASER-PUMPED MONOLITHIC OPTICAL PARAMETRIC OSCILLATOR

[75] Inventors: Laurent Fulbert, Voiron; Engin Molva; Philippe Thony, both of Grenoble, all of France

[73] Assignee: Commissariat a l'Energie Atomique, Paris, France

[21] Appl. No.: 637,278

[22] Filed: Apr. 25, 1996

[30] Foreign Application Priority Data

May 12, 1995 [FR] France ................... 95 05654

[51] Int. Cl.[6] ........................................ G02F 1/39
[52] U.S. Cl. .................................. 359/330; 372/21
[58] Field of Search ........................... 359/326, 328, 359/330; 372/21, 22

[56] References Cited

U.S. PATENT DOCUMENTS

| | | | |
|---|---|---|---|
| Re. 34,812 | 12/1994 | Zayhowski et al. | 372/10 |
| 3,609,389 | 9/1971 | Bjorkholm | 359/330 |
| 3,824,717 | 7/1974 | Evtuhov et al. | 359/330 |
| 5,048,051 | 9/1991 | Zayhowski | 372/101 |
| 5,115,445 | 5/1992 | Mooradian | 372/75 |
| 5,181,211 | 1/1993 | Burnham et al. | 372/21 |
| 5,191,587 | 3/1993 | Hanson et al. | 372/21 |
| 5,295,010 | 3/1994 | Barnes et al. | 359/330 X |
| 5,394,413 | 2/1995 | Zayhowski | 372/10 |
| 5,402,437 | 3/1995 | Mooradian | 372/22 X |
| 5,574,740 | 11/1996 | Hargis et al. | 372/21 X |

FOREIGN PATENT DOCUMENTS

| | | |
|---|---|---|
| 0 523 861 | 1/1993 | European Pat. Off. |
| 1 566 716 | 5/1980 | United Kingdom |
| WO 90/09688 | 8/1990 | WIPO |

OTHER PUBLICATIONS

Non-linear Optics, pp. 85-90, Boyd, "Phase-Matching Considerations" [No Publisher or Date Indicated].

J. Optical Society of America, B. vol. 10, No. 9, pp. 1659-1667, Sep. 1993, D. Lee et al., "Stabilization and Tuning of a Doubly Resonant Optical Parametric Oscillator".

J. Opt. Soc. Am., B. vol. 11, No. 5, pp. 758-769, May 1994, J.A.C. Terry, et al., "Low-Threshold Operation of an All-Solid-State KTP Optical Parametric Oscillator".

Optics Letters, vol. 17, No. 17, pp. 1201-1203, Sep. 1, 1992, J. J. Zayhowski, et al., "Diode-Pumped Microchip Lasers Electro-Optically Q Switched at High Pulse Repetition Rates".

Optics Communications, vol. 10, No. 1, pp. 18-20, Jan. 1974, K.H. Drexhage, et al., "New Dye Solutions for Mode-Locking Infrared Lasers".

Mol. Cryst. Liq. Cryst., vol. 183, pp. 291-302, 1990, U.T. Mueller-Westerhoff, et al., "Near-Ir Dyes for the 1.3 to 1.5 Micron Region: The Use of Substituted Dithiolene Complexes", [No Month].

Cleo 92, p. 282, A. Eda, et al., "CWG33 Microchip Lasers Fabricated by a Novel Photolithography Technique", 1992, [No Month].

*Primary Examiner*—John D. Lee
*Attorney, Agent, or Firm*—Oblon, Spivak, McClelland, Maier & Neustadt, P.C.

[57] ABSTRACT

The invention relates to an optical parametric oscillator characterized in that it comprises an OPO nonlinear material (18) and two mirrors (24, 26) on either side of said nonlinear material and forming an OPO cavity and a switched microlaser (2, 6, 8, 26) for generating an OPO cavity laser pumping beam.

42 Claims, 5 Drawing Sheets

MICROLASER-PUMPED MONOLITHIC OPTICAL PARAMETRIC OSCILLATOR

TECHNICAL FIELD

The invention relates to the field of optical parametric oscillators.

Optical parametric oscillators (OPO) make it possible, by bringing about an interaction of a high power, laser pumping beam and a nonlinear crystal, to generate radiation of a higher wavelength than that of the laser and whose space and time characteristics are close to those of the pumping beam. By modifying the nonlinear crystal phase matching conditions, either by rotating the crystal or changing the temperature, it is possible to continuously vary within a very wide range the emitted radiation wavelength. Thus, this device makes it possible to reach wavelength ranges which have been hitherto inaccessible with conventional lasers.

More specifically, the process for generating a variable wavelength radiation is based on nonlinear phenomena, which appear in certain materials subject to a high optical power density. A pumping photon of frequency $v_p$ is broken down into two photons, the photon of highest frequency $v_s$ is called the "signal" photon and that of the lower frequency $v_i$ is called the "complimentary" photon or idler. For energy conservation reasons the relation $v_s+v_i=v_p$ applies.

For obtaining an OPO, the most widely used means consists of placing a nonlinear material within a cavity. When it is a resonant cavity for the signal photons or idler, it is said to resonate. When the pumping power exceeds a certain threshold, the gain exceeds the losses and the "signal" photons are emitted by the cavity.

In order to lower the OPO operating threshold, it is possible to place the nonlinear material in a doubly or triply resonating cavity (resonance for the signal and idler and/or pump). The thresholds are then much lower and it is possible to make the OPO operate continuously. However, the construction of such cavities and the stabilization of the modes cause difficult and costly technical problems.

OPO's have applications in fields such as laser telemetry, environment, scientific and medical instrumentation, etc. In most of these applications, there is a need for an OPO operating in the pulsed mode with high peak output powers.

STATE OF THE ART

The OPO can operate continuously or in pulsed manner.

In the case of a continuous operation, the nonlinear material is placed in a resonant cavity and converts the pumping photons into photons with a higher wavelength. It is necessary to have high power levels to obtain a good conversion efficiency. This can be carried out continuously, but to the detriment of simplicity, using doubly or triply resonating cavities which make it possible to increase the power density on the nonlinear material.

In the case of pulsed operation, the nonlinear material is pumped by a laser emitting pulses of short duration and high peak power. The conversion efficiencies are consequently much higher than in continuous operation and single resonating cavities of simple design can be used.

An example of an OPO with pulsed operation is given in the article by J. A. C. Terry et al entitled "Low threshold operation of an all-solid-state KTP optical parametric oscillator", published in Journal of Optical Society of America, B, vol. 11, No. 5, pp 758–769, 1994.

This article describes the operation of a singly resonating OPO pumped by a switched laser. The nonlinear material is a 20 mm long KTP crystal. Pumping takes place by a YLF:Nd switched laser supplying pulses with a width of 18 ns at a wavelength of 1.047 µm.

In certain configurations, the OPO operating threshold is 0.7 mJ with a radius of the pumping beam of 230 µm, i.e. a power density in the nonlinear material of 23 MW/cm².

Although the threshold power density of the OPO described in this document is relatively low, the threshold energy is relatively high due to the long pulse duration (18 ns) and the large beam radius (230 um). Pumping lasers supplying such energies are costly and have large dimensions. Moreover, the OPO is not monolithic and necessarily has regulating and alignment phases in order to operate continuously, so that it is not reliable. Finally, its structure is not adapted to a low cost, mass production process.

In general terms, existing OPO's are expensive, large devices, particularly due to the presence of a high power pumping laser.

DESCRIPTION OF THE INVENTION

The object of the invention is an optical parametric oscillator pumped by a switched laser making it possible to improve the known device in order to reduce the OPO operating threshold and reduce its overall dimensions.

A reduction of the OPO dimensions passes through a reduction of the nonlinear crystal length, which means a reduction in the conversion efficiency of the latter. Moreover, a reduction of the OPO operating threshold leads to the pumping of the crystal with lower pumping energies.

The output signal of the OPO is proportional to the product of the conversion efficiency by the pumping energy, so that there is incompatibility when wishing to solve the two aforementioned problems, because their simultaneous solution would lead to a considerable reduction in the intensity of the OPO output signal. However, the invention proposes a solution to this double problem.

To this end, it relates to an optical parametric oscillator, characterized in that it comprises an OPO nonlinear material and two mirrors located on either side of the nonlinear material and forming a cavity and a switched microlaser for generating a cavity pumping laser beam.

The solid microlasers (or laser chip) are pumped by a diode and compact (a few cm³). The development of III–V laser diodes with a power adapted to the pumping of different laser materials doped with different dopants makes it possible to obtain microlasers in a relatively wide wavelength range between 1 and 2 microns.

The microlaser has a multilayer stack structure. The active layer medium is constituted by a material of limited thickness between 150 and 1000 µm and small dimensions of a few mm², on which are directly deposited cavity dielectric mirrors.

Due to the limited cavity length of the switched microlasers, the width of their pulses is small (typically <1 ns or at the most a few ns). In the same way, the dimensions of the beams are reduced. This makes it possible to obtain a high pumping power density (in particular equal to or exceeding that given in the aforementioned article), whilst having a reduced pulse energy. Therefore the threshold energy is reduced. Moreover, through having a high power density in a small cross-section beam it is possible to reduce the OPO size.

The solution to the double problem referred to hereinbefore consequently consists of choosing a switched microlaser as the pumping source.

For example, for a microlaser emitting pulses of 5 μJ, with a time width of 750 ps and a beam radius of 65 μm (values which are at present typically encountered), the power density at the microlaser output is 50 MW/cm$^2$, which exceeds the OPO threshold described in the article of Terry et al referred to hereinbefore (23 MW/cm$^2$). The size of the OPO nonlinear material can then be reduced to a few millimeters, e.g. approximately 5 mm which, compared with the OPO size described in said article (20 mm) represents a reduction by a factor of 4 of the overall dimensions, which is considerable. By using a microlaser emitting higher energy pulses (up to 50 μJ), the OPO nonlinear material size can be further reduced.

The compactness of the system is increased if the mirrors forming the OPO cavity are directly deposited on the OPO nonlinear material.

It is also possible to obtain such an optical parametric oscillator, with the microlaser cavity having an input mirror and an output mirror, the latter also forming the input mirror of the OPO cavity.

This leads to a compact, monolithic device compatible with mass production processes using microelectronics methods.

According to another embodiment, the input mirror of the OPO cavity can be transparent to the wavelength emitted by the microlaser, the OPO crystal being placed in the microlaser cavity. In this case, the energy density at the input of the OPO cavity (pumping energy) is even higher.

If a doubly resonating OPO cavity is obtained, the operating threshold of the OPO is further reduced.

It is possible to produce stable cavities with concave mirrors on the faces of the microlaser and/or the nonlinear material. A stabilized cavity has a lower threshold and a better efficiency. It also makes it possible to adjust the size of the laser beam in the nonlinear material.

According to an embodiment, the microlaser cavity is passively switched by a saturable absorber.

Another aspect of the invention relates to the relative arrangement of the saturable absorber and the active medium within the microlaser cavity.

According to this embodiment, the saturable absorber can be deposited in thin film form directly on the active material of the microlaser cavity.

One of the main advantages of this embodiment is the structure of the microlaser cavity (or the laser microsystem consisting of a microlaser associated with microoptics) in switched form, which then consists of a stack of films or layers, making it possible to retain the possibility of low cost mass production. This multilayer structure does not call into doubt the simplicity and mass production processes at low cost of the microlasers, such as have been developed for continuous microlasers. It makes it possible to produce fool-proof, self-aligned (no optical setting), monolithic, passively switched microlasers. This structure requires no adhesion or bonding operation (unlike solutions consisting of bonding the saturable absorber to another microlaser cavity element) and also no complex alignment operation (unlike solutions consisting of placing the saturable absorber without any contact with other elements of the microlaser cavity).

Another advantage of the microlaser compared with the "codoped" laser (the same medium containing both the laser active ions and the saturable absorber ions) is that the active medium is separated from the saturable absorber, whilst avoiding the adhesion of the two media and retaining a monolithic structure. Thus, it is possible on the one hand to independently regulate the thicknesses (during the deposition of films or by mechanical thinning following the deposition of the films) and the concentrations of the ions in the two media and on the other hand, as a result of said separation, to obtain switched lasers where the same ion (e.g. Er) can be used as the active ion and as the saturable absorber with different concentrations.

According to another aspect of the invention, the film can be formed by an organic dye dissolved in a polymer solvent. According to a variant, the film can be deposited by liquid phase epitaxy.

The microlaser cavity can also be actively switched. In the field of microlasers, an active switching procedure is described in the article by J. J. Zayhowski et al entitled "Diode-pumped microchip lasers electro-optically Q switched at high pulse repetition rates", published in Optics Letters, vol. 17, No. 17, pp 1201–1203, 1992. This procedure can also be used in the present invention.

In this document, switching takes place in a configuration of two coupled Fabry-Perot cavities. The active laser medium of length $L_1$ forms, with an input mirror and an intermediate mirror, a first Fabry-Perot cavity. The switching material (electrooptical material, $LiTaO_3$) of length $L_2$ forms, with the intermediate mirror and the output mirror, a second Fabry-Perot cavity. Switching takes place by modifying the optical length of the switching material by an external action. Switching electrodes are placed perpendicular to the laser beam axis on either side of the switching material. If a voltage V is applied between these electrodes, an electric field E=V/e, where e is the distance between the electrodes (which corresponds to the thickness of the electrooptical material) results therefrom. The optical refractive index $n_2$ and consequently the optical length $n_2 L_2$ of the electrooptical material is modified by the action of the field E. This affects the coupling of the two Fabry-Perot cavities and modifies the reflectivity of the intermediate mirror seen by the laser medium. However, this procedure suffers from disadvantages.

Firstly the microlaser described in said document is manufactured by a manual process (it involves the bonding together of precut fragments). This imposes a lower limit for the geometrical dimensions, which are at a minimum around 1 mm, and in particular for the distance between the two electrodes. Another problem is the need to reach a field E adequate for switching. Thus, it is necessary to apply a voltage of approximately 1000 V between the two electrodes in a very short time of less than 1 nanosecond and on laser chips with a volume of approximately 1 mm$^3$. This is very difficult to implement in practice and requires sophisticated electronics incompatible with the simplicity and low production costs of the microlaser.

In order to solve this problem and according to an embodiment of the invention, the active laser medium forms a first resonant cavity between an input mirror and an intermediate mirror, a second material forms a second resonant cavity between the intermediate mirror and an output mirror, the optical index of said material being modulatable by an external disturbance, and laser beam size reduction means are located at the input of the first resonant cavity, the assembly of the two cavities and the laser beam reduction means being monolithic.

Thus, according to this embodiment, the invention solves the problem of the high voltage to be applied between the electrodes whilst making it possible to reduce the microlaser cavity threshold. Thus, with this structure, it is possible to bring the thickness of the second material down to approximately 100 μm. In the case of an electrooptical material, this makes it possible to limit the voltage required to between 50 and 100 V. Moreover, the microlaser switching threshold is reduced to a few milliwatts. Finally, this structure is compatible with mass production processes making it possible to manufacture small samples and respect the necessary production costs.

The laser beam size reduction means can be constituted by a concave mirror produced with a micromirror on the face of the active laser medium to be traversed by the pumping beam. The output mirror can be a concave mirror produced with a micromirror on the output face of the second material. The two Fabry-Perot cavities can be produced in an optically stable manner.

According to a variant, which makes it possible to obtain a microlaser operating in the active mode and having an even simpler structure, the microlaser cavity is at the optical stability limit and means are provided for varying the optical length of the cavity so as to pass it from an optically unstable state to an optically stable state.

Thus, a new active switching is obtained, because the optically unstable state is a high cavity loss state, unlike the optically stable state.

In addition, the structure obtained is radically different from that known e.g. from the article of J. J. Zayhowski (cf. hereinbefore), because there is now only one Fabry-Perot cavity.

The cavity can be a hemispherical, confocal, concentric or spherical cavity. In this case, the size of the beam in the cavity is smaller and it is then possible to reduce the thicknesses of the materials used. The microlaser size is consequently further reduced. This leads to a solution of one of the problems referred to hereinbefore, namely that of the high voltage to be applied if the second material is an electrooptical material. Thus, as the thickness of the latter is reduced, the same electric field is obtained for a lower voltage ($\vec{E}=\Delta V/e$, where is the thickness between the electrodes).

According to a special embodiment, apart from the active laser medium, the microlaser cavity has a second material of variable optical length. However, this only requires one and not two Fabry-Perot cavities.

This leads to a very compact, monolithic structure.

The means for varying the optical length of the cavity can incorporate means for varying the length of the second material.

According to another embodiment, the active laser medium and the second material have different optical indexes and the means for varying the optical length of the cavity has means for varying the optical index of the second material, which can be an electrooptical material.

Thus, a single microlaser cavity is produced, whose optical length is modified to move the cavity from the high loss, unstable range, to the low loss, stable range, which permits the switching thereof. It is only necessary to have a single Fabry-Perot cavity, even if it contains several materials (the active laser material and the variable optical length material).

When the materials are juxtaposed, bonded together or adhere to one another by molecular adhesion, the compactness of the system is improved, which is very important in the case of a microlaser.

BRIEF DESCRIPTION OF THE DRAWINGS

The invention is described in greater detail hereinafter relative to nonlimitative embodiments and the attached drawings, wherein show.

DETAILED DESCRIPTION OF EMBODIMENTS

Figure 1:
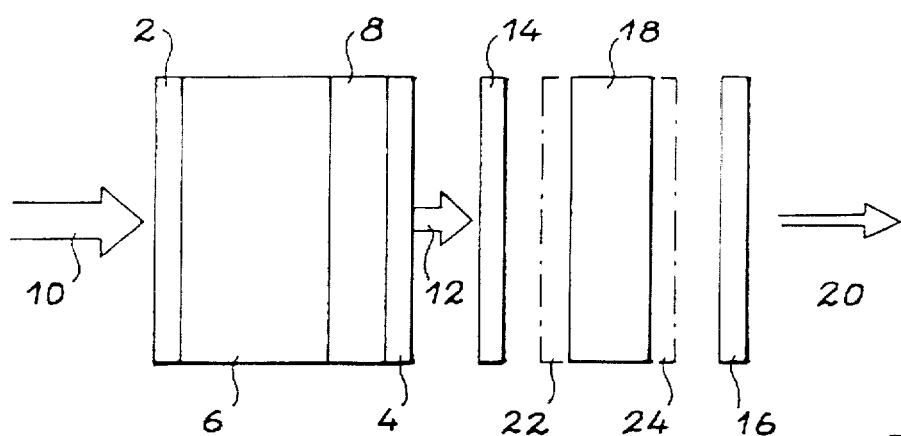
FIGS. 1 to 3 Different embodiments of the invention.

FIG. 1 illustrates a first embodiment of the invention showing an input mirror 2 and output mirror 4 of a microlaser cavity having an active laser medium 6 and means 8 for switching said microlaser cavity in the active or passive mode. The cavity can be pumped by not shown means, the pumping beam being designated 10. The cavity emits a laser beam 12, which will in turn pump a second cavity or OPO cavity. The OPO cavity is defined by two mirrors 14, 16 between which is placed a nonlinear material 18 (e.g. a crystal) making it possible to obtain an optical parametric oscillator cavity, which in turn emits an OPO beam 20.

The material constituting the medium 18 can be chosen from among known, nonlinear materials such as e.g. $KTiOPO_4$ (KTP), $MgO:LiNbO_3$, $\beta$—$BaB_2O_4$, $LiB_3O_5$ and AgGaSe. The properties of the KTP material are e.g. described in the article by Terry et al published in Journal of Optical Society of America, B., vol. 11, pp 758–769, 1994. The properties of other nonlinear materials making it possible to obtain an OPO are described by the word of R. W. Boyd entitled "Nonlinear optics", Academic Press, 1992, U.S.A., ISBN 0-12-121680-2, particularly pp 85 ff. The input and output mirrors of the OPO cavity can also be arranged in the manner shown in dotted line form in FIG. 1. In this case the two mirrors 22, 24 are directly deposited on the input and output faces of the material 18. This configuration leads to greater compactness and to the obtaining of a fool-proof cavity, which does not have to be aligned during operation.

As a result of the pumping by a microlaser, it is possible not only to lower the threshold energy of the OPO cavity, but also reduce the length of the crystal 18 necessary for the operation of the OPO. Thus, in the aforementioned article by Terry et al, an OPO with a crystal length of 20 mm is described, whilst the invention makes it possible to use materials with a thickness of a few mm, e.g. 5 mm. In general terms, due to the properties of the beam 12 emitted by the laser, this result (reduced threshold energy, reduced crystal length) is applicable not only to the KTP crystal described in the Terry article, but also any other crystal or nonlinear material used for producing an OPO cavity.

Figure 2:
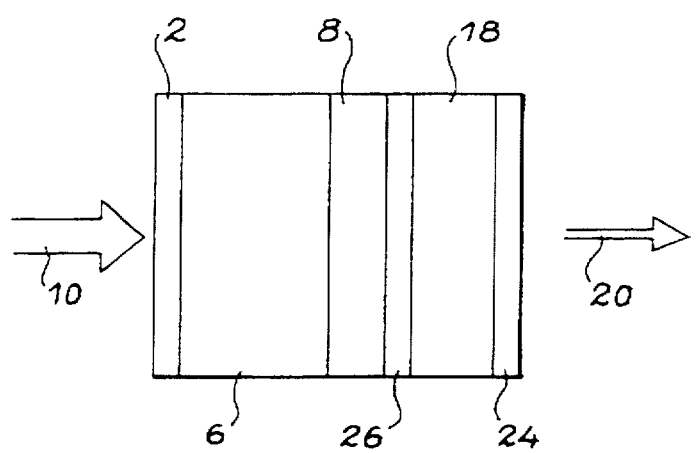

The compactness of the system is further increased if, as illustrated in FIG. 2, the mirrors 4 and 14 coincide. The structure obtained is then an extremely compact structure. FIG. 2 shows elements identical to those of FIG. 1 with the same references and 26 is an intermediate mirror common to the microlaser cavity and OPO cavity. As the microlaser cavity is very compact, even with a switching element 8, it is thus possible to obtain an OPO oscillator, whose total length, including the pumping means, does not exceed 6 mm for a cross-section of 1 $mm^2$, i.e. a total volume of 6 $mm^3$.

Moreover, all the structures described hereinbefore also benefit from microlaser mass production procedures. The deposition of the mirror directly on the nonlinear material 18 is also compatible with mass production methods and consequently the complete apparatus is compatible with such methods, which are used in microelectronics. It is therefore possible to obtain a low cost mass production.

The constituent material of the active medium 6 is e.g. doped with neodymium (Nd) for a laser emission of about 1.06 μm. This material could e.g. be chosen from one of the following materials: YAG ($Y_3Al_5O_{12}$), LMA (LaMgAl$_{11}$O$_{19}$), YVO$_4$, YSO ($Y_2SiO_5$), YLF (YLiF$_4$) or GdVO$_4$, etc. This choice will be conditioned by the following criteria, but will also depend on the particular applications.

If the laser cavity is optically pumped, preferably with one or more laser diodes, the material must have a high absorption coefficient at the wavelength of the pump (e.g. III–V laser diode emitting at about 800 nm) in order to increase the pumping efficiency, whilst retaining a low material thickness (<1 mm).

A wide absorption band at the wavelength of the pump, e.g. 800 nm, in order to satisfy the problem of stabilizing the laser diode wavelength.

A large effective stimulated emission cross-section to obtain high efficiencies and high output power levels.

A small emission band width in order to easily obtain a monofrequency laser or, conversely, a wide emission band to obtain a frequency-tunable laser emission.

Good thermomechanical properties to simplify the machining of the material and limit the thermal effects prejudicial to a good dissipation of the heat produced by the absorption of the pump (said excess heat being dependent on the energy efficiency of the laser).

A short life in the excited state for a high switching rate.

Large dimensions so as to be able to simultaneously mass produce the largest possible number of microlasers with a single laser crystal.

Among the known materials, those most suitable for the operation of the microlaser are (with life periods comparable to a few hundred microseconds):

YVO$_4$, which has a good coefficient and wide absorption band, together with a good effective cross-section, YAG, whose absorption coefficient and effective stimulated emission cross-section are average and whose absorption and emission band widths are small, so that it has large dimensions and a good thermal conductivity, LMA, which offers a low absorption coefficient and effective cross-section, wide absorption and emission bands and can also have large dimensions.

With regards to the active ions (dopants), they are generally chosen from among:

Nd for an emission of around 1.06 µm,

Er or an erbium-ytterbium Er+Yb codoping for an emission around 1.5 µm,

Tm or Ho or a thulium and holmium codoping for an emission around 2 µm.

Another parameter is the thickness e of the active material 6. The thickness e conditions the characteristics of the microlaser:

on the one hand the absorption of the pumping beam will increase as the thickness e increases, on the other hand the number of longitudinal modes of a Fabry-Perot cavity increases with the thickness and if it is wished to obtain a longitudinal monomode laser said thickness must be small.

If dg is the width of the gain band (laser emission) of the material, the number of modes N will be given by:

$$N = dg/dv \text{ with } dv = \frac{C}{2nL}$$

in which C is the speed of light and n the refractive index.

For a monofrequency laser, normally a minimum thickness for N=1 is chosen, provided that said thickness is >100 µm. The typical thicknesses for obtaining a single mode are:

YAG L=750 µm,
YVO$_4$ L=500 µm,
LMA L=150 µm.

Thus, in practice, the thickness e will vary between 100 µm and about 1 mm.

In order to obtain a complete laser cavity, the active medium with the switching element 8 is between two mirrors 2, 4 (FIG. 1) or 2, 26 (FIG. 2). The input mirror 2, deposited by known processes, is preferably a dichroic mirror having a maximum reflectivity (as close as possible to 100%) at the wavelength of the laser and the highest possible transmissioon (>80%) at the wavelength of the pump (generally about 800 nm for Nd doped materials, 980 nm for Er doped materials and 780 nm for Tm doped materials). The output mirror 4, 26 is also preferably a dichroic mirror, but allows the passage of a few per cent of the laser beam.

In the case illustrated in FIG. 2, the mirror 26 must also reflect at the wavelength of the OPO signal beam, whilst the mirror 16 reflects at said wavelength. In the case of a singly resonating cavity, the mirrors 26 and 16 are transparent to the wavelength of the idler beam. For a doubly resonating cavity, they reflect at this wavelength.

The pumping of the microlaser cavity is preferably an optical pumping. Thus, III–V laser diodes are particularly suitable for pumping a microlaser cavity.

Optionally, it is possible to produce by a prior art method (A. Eda et al, CLEO'92, paper CWG33, p 282 (Conf. on Laser and Electro-optics, Anaheim, U.S.A., May 1992)) a microlens array of a transparent material (silica, etc.) on the input surface of the laser material 6. The typical dimensions of such microlenses are a diameter of 100 to a few hundred microns and radii of curvature of a few hundred micrometers to a few millimeters.

These microlenses are used to produce "stable" cavities (the "plane—plane" cavity not being stable) of the plano-concave type. In the case of an optical pumping, they also make it possible to focus the pumping beam and reduce the size of the beams in the two cavities (microlaser and OPO).

The aforementioned method can also make it possible to produce microlenses at the output of the OPO cavity, which also makes it possible to focus the beams in both cavities.

The stabilization of these cavities makes it possible to reduce the losses therein and increase their operating efficiency.

With regards the OPO cavity, it is possible to adjust the reflectivities of the input and output mirrors of said cavities (14, 16, 22, 24 in FIGS. 1 and 26, 16 in FIG. 2), so as to form a doubly resonating cavity around the nonlinear material 18. The input mirror 26 must have a high reflectivity close to 100% at $\lambda_{signal}$ for a singly resonating cavity and a reflectivity close to 100% at $\lambda_{idler}$ for a doubly resonating cavity. The output mirror 16 has a reflectivity higher than 90% at $\lambda_{signal}$ for a singly resonating cavity and $\lambda_{idler}$ for a doubly resonating cavity. This makes it possible to further reduce the operating threshold of the cavity 18.

Figure 3:
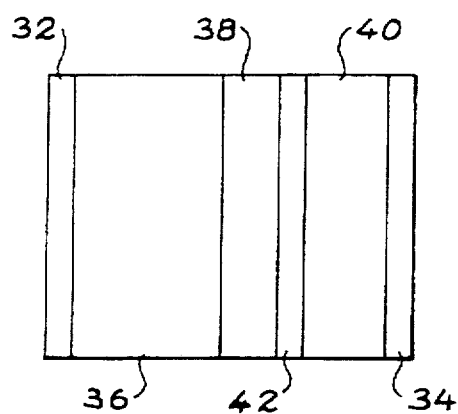

Another embodiment is illustrated in FIG. 3. On this occasion there are no longer two separate cavities (microlaser cavity and OPO cavity), but instead a single microlaser cavity containing the OPO cavity. The microlaser cavity is defined by an input mirror 32 and output mirror 34 of the microlaser cavity. It contains an active laser medium 36, a cavity switching element 38, a nonlinear crystal 40 forming, with an intermediate mirror 42 and the output mirror 34 of the cavity, an OPO "subcavity". To this end, the intermediate mirror 42 is transparent at the wavelength of the laser beam and reflecting at the wavelength of the signal beam of the OPO cavity, whilst the mirror 42 is transparent at $\lambda_{idler}$ for a single resonating cavity and reflecting at $\lambda_{idler}$ for a doubly resonating cavity. The mirror 34 is partly transparent at the wavelength of the signal beam of the OPO cavity. This embodiment makes it possible to have an even higher energy density within the OPO cavity, whilst retaining the benefit of an extremely compact, monolithic structure.

According to an embodiment, the microlaser cavity is passively switched. In this case, the switching element 8, 38 is a saturable absorber element.

According to a particularly advantageous embodiment the saturable absorber is in the form of a film. In particular, it can be advantageous to deposit the saturable absorber film directly on the laser amplifier medium.

Two types of film can be used:

A polymer containing saturable absorber molecules. Typically for a microlaser at 1.06 um, it is possible to use as the saturable absorber an organic dye such as bis(4-diethylaminodithiobenzyl)nickel (BDN, Kodak, CAS No. 51449-18-4) in a solution containing by weight 6% polymethyl methacrylate (PMMA) in chlorobenzene.

Variants are described hereinafter in conjunction with the description of a preparation process.

This type of solution is deposited by trammel directly on the laser material (cf. hereinafter for the preparation process). This leads to films with a thickness of 1 to 5 μm, e.g. 2, 3 or 4 μm.

Another type of film is obtained by liquid phase epitaxy (LPE), directly on the laser material or any other process making it possible to obtain the same deposit (same material, same doping, same properties). Thus, in more general terms, the film can be obtained by LPE. The preparation process by LPE is described hereinafter and makes it possible to obtain on the substrate constituted by the solid active medium, a film with a thickness between 1 and 500 μm (e.g. 100, 200, 300 or 400 μm). It is constituted by a basic material identical to the basic material of the solid active medium (e.g. YAG), but it is doped with ions giving it saturable absorber properties, e.g. $Cr^{4+}$ for a laser at 1.06 μm or $Er^{3+}$ for a laser at 1.5 μm.

Thus, the dopant type is adapted to the laser which it is wished to switch, so that the epitaxied film has a saturable absorption at the emission wavelength of said laser.

Consequently, in this case, the active laser material and the saturable absorber film have the same crystalline structure and only differ by the different dopants which affect the crystalline and optical properties of these two media. The properties of the film in the two cases will therefore differ significantly.

Thus, the damage threshold is defined for each film type. Beyond a certain power density present in the laser cavity, it is possible to destroy the saturable absorber film. This limit power density, called the damage threshold, will be lower in the case of the polymer with the organic dye than in the case of the LPE-deposited film. Thus, in the first case it is necessary to operate with lower energies deposited in the cavity than in the second case.

Moreover, in one case, the index difference between the laser material and the polymer introduces an optical interface between the two media. In the other case, LPE is only possible on the same material (e.g. YAG on YAG and only the doping differs), which makes it possible to adjust the index of the epitaxied film to that of the active laser medium serving as the epitaxy substrate and therefore avoid the formation of an optical interface between the two media.

Finally, the nature of the film will influence the time form or shape of the laser pulse. In the case of the organic dye dissolved in a polymer, the dye decline time is very short (~1 ns), whereas in the case of the epitaxied film the ions constituting the impurities ($Cr^{4+}$, $Er^{3+}$) have a little longer decline times (a few nanoseconds). These properties will clearly condition the choice of the film as a function of the intended use.

The structure described hereinbefore (saturable absorber in the form of a film directly deposited on the active laser medium) makes it possible to obtain a compact microlaser cavity requiring no alignment, requiring the introduction of no parasitic element such as an optical adhesive and also avoiding the need for the codoping of the same basic medium for forming therefrom the active laser medium and the passive switching element.

Figure 4A:
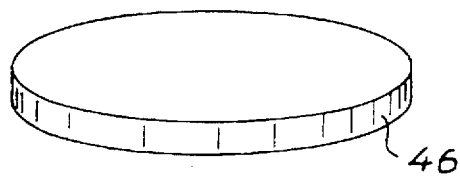
FIGS. 4A to 4F The stages of producing an OPO according to the invention.

A process for the production of an OPO according to the invention with a passively switched microlaser will now be described for obtaining a structure like that of FIG. 2. In such a process, the following stages are involved:

1) The active laser material is chosen and conditioned and is oriented and cut into plates 46 with a thickness between 0.5 and 5 mm (FIG. 4A). The plates are then ground and polished, which leads to the final, desired thickness e.

Figure 4B:
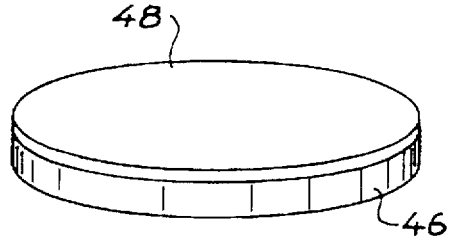

2) A stage of preparing the saturable absorber 48 (FIG. 4B).

2a) In the case of a conventional saturable absorber, various processes are known making it possible to obtain a switched microlaser cavity. In particular, it is possible to carry out a codoping of the basic material of the active laser medium, so as to give it the properties of the active laser medium and saturable absorber (e.g. YAG doped with neodymium $Nd^{3+}$ and chromium $Cr^{4+}$ ions).

2b) In the case of a saturable absorber deposited in thin film form, two types of deposit can be obtained:

2b1) First type of deposit: deposit of a saturable absorber organic dye dissolved in a polymer.

Typically, for a microlaser operating at 1.06 μm, it is possible to use as the saturable absorber an organic dye such as bis(4-diethylaminodithiobenzyl) nickel (BDN, Kodak, CAS No. 51449-18-4) in a polymethyl methacrylate (PMMA) solution. For this purpose preparation takes place of a solution containing by weight 6% polymethyl methacrylate (Polyscience average weights) in chlorobenzene (Prolabo) stirring for 24 hours. To it is added 0.2 wt.% BDN and stirring takes place for a further two hours. The solution is then filtered and deposited on the substrate in dropwise manner on the exit face with a circular centrifugal movement. For said "trammel" deposit it is possible to use a standard machine such as that used in microelectronics for the deposition of resins used in lithography operations. The substrate is previously cleaned with respect to all traces of impurities resulting from the polishing operation. It is rotated (trammel) for 20 seconds at 2000 r.p.m. and then 30 seconds at 5000 r.p.m. The film is finally dried for 2 hours in an oven at 70° C.

This leads to a 1 μm thick film containing 3% active molecules (BDN) and whose optical density is 0.13 at 1.06 μm (74% transmission) before saturation.

By varying the polymer concentration parameters, its molecular weight or its solvent, the dye proportion and the rotation speed of the trammel, it is possible to adjust the saturable absorber performance characteristics. The typical specifications obtained are:

film thickness:1 to 50 μm (e.g. 2, 3 or 4 μm), molecule density:5 to 10 wt.%, dye:BDN, mm=685 g, glass transition point:Tg=78° C., absorption at 1.06 um:10 to 70%, saturation level:90%, effective cross-section:$10^{-16}$ cm$^2$, saturation intensity:0.1 to 1 MW/cm$^2$, film non-uniformity:<5% on 1 cm$^2$, depolarization level:<$10^{-5}$, losses at 800 nm:<1%, repetition rate:10 to 10,000 Hz, photostability:$10^8$ strokes, deposition method:trammel.

Other polymers such as polyvinyl alcohol, polyvinyl acetate or polystyrene can be used in their respective solvents in place of PMMA. It is also possible to use as the dye bis(4-dimethylaminodithiobenzyl) nickel (BDN, Kodak, CAS No. 38465-55-3).

The dye can also be incorporated into a silica gel or grafted to the polymer chain.

Other dithiene metal complexes can be used as the dye for other wavelengths, as described in the articles of K. H. Drexhage et al, Optics Communication 10(1), 19, 1974 and Mueller-Westerhoff, Mol. Cryst. Liq. Cryst. 183, 291, 1990.

The method can also be used for the switching of lasers operating at wavelengths other than 1.06 μm. For example, switching will take place of Er or Er=Yb lasers (Er or Er+Yb-doped materials, where the active ion is Er) emitting at about 1.5 μm with tetraethyloctahydrotetraazapentaphene-dithiolato-nickel (cf. article of Mueller-Westerhoff referred to hereinbefore).

2b2) Second type of deposit: deposit of a film by liquid phase expitaxy (LPE).

The saturable absorber (S.A.) film is obtained by soaking the substrate, on which it is deposited, in an appropriately chosen supersaturated solution. This solution or epitaxy bath is a mixture of a solvent and a solute constituted by different elements forming the final material. The substrate and film have the same crystalline structure and only differ by the different dopants which affect the crystalline and optical properties of the film. The active ions such as Nd, Er and Yb make the material amplifying, other ions (Cr, Er) give it S.A. properties and certain others can be used for varying the refractive index or crystal lattice of the material (e.g. Ga, Ge, Lu, etc.).

It is thus possible to control the properties of the films produced. This process can be applied to any material in the form of monocrystals (for producing substrates) and which can be prepared by liquid phase epitaxy. This is the case with the aforementioned materials for the basic material of the active laser medium: $Y_3Al_5O_{12}$ (YAG), $Y_2SiO_5$ (YSO), $YVO_4$, $YLiF_4$ (YLF) or $GdVO_4$. The composition of the bath (choice of solvent and substituents), the concentrations in the solute of the different oxides and the experimental growth conditions (temperature range, operating method, etc.) are adjusted for each material in order to obtain films having the optimum crystalline quality.

In the case of garnets (YAG), the chosen solvent is a PbO/$B_2O_3$ mixture and the solute comprises an $Al_2O_3$ excess in order to stabilize the garnet phase. The solute/solvent ratio is then calculated so as to obtain a growth at about 1000° C.

As a function of the composition of the bath, the temperature and deposition time, it is possible to adjust the thickness ($1 \leq e \leq 200$ μm, e.g. 25 μm, 50 μm, 75 μm, 100 μm, 125 μm, 150 μm, 175 μm, and it is also possible to obtain $e \geq 200$ μm) and the dopant concentration in the films. The growth of a film takes place at constant temperature, so that a uniform dopant concentration can be obtained in the film thickness. The substrate undergoes an alternating or uniform rotary movement, which gives a good thickness uniformity.

It is possible to produce a substrate carrying one or two S.A. films, as a function of whether soaking takes place of the surface of one face of the active laser material in the bath, or both faces thereof, the laser material then being completely immersed in the bath.

The epitaxied face or faces obtained can be repolished in order to remove any roughness which may be caused by the epitaxy process and bring the thickness of the epitaxied film or films to the desired level for the operation of the microlaser.

Figure 4C:
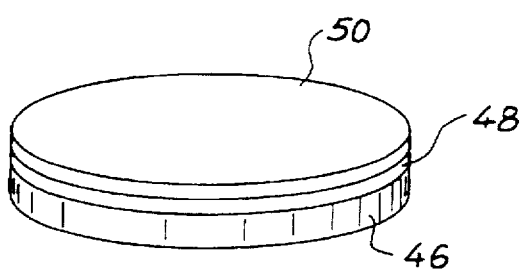

3) A stage of depositing the output mirror 50 of the microlaser cavity (FIG. 4C). It can be a dichroic mirror obtained by dielectric multilayer deposition, which is known to the expert and is commercially available. In the embodiment of FIG. 2, said mirror is used both as a laser cavity output coupler and as an input mirror for the second cavity containing the nonlinear material.

Figure 4D:
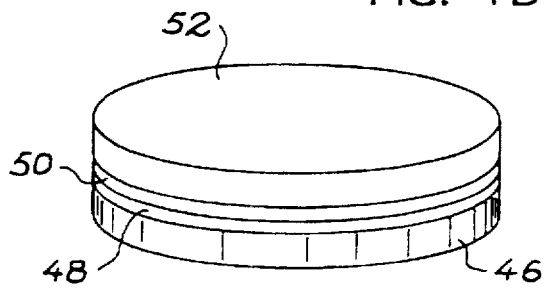

4) A stage of depositing the nonlinear material or OPO crystal 52 (FIG. 4D). The cutting procedure for the crystal and in particular the orientation to be given to the latter as a function of the desired wavelength for the signal beam are described in the work or R. W. Boyd entitled "Nonlinear Optics", Academic Press, 1992, U.S.A., ISBN 0-12-1216802, pp 85–90.

Figure 4E:
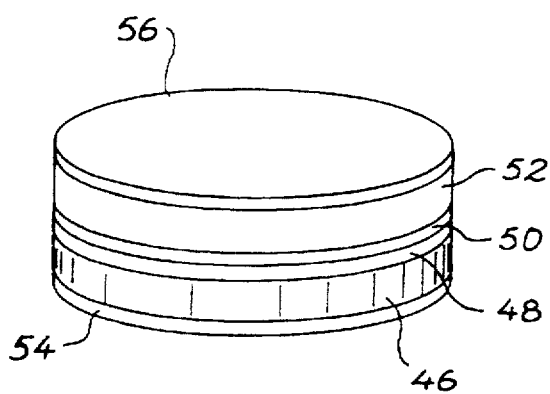

5) A stage of depositing mirrors on the two faces of the assembly (FIG. 4E: input dichroic mirror 54 with a high reflectivity at the laser frequency, a high transmission at the pumping laser diode wavelength, the output mirror 56 being the output coupler of the OPO cavity).

Figure 4F:
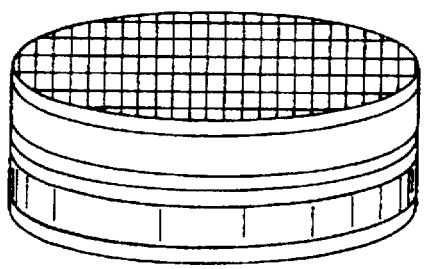

6) A stage of cutting plates in order to obtain microlaser chips (FIG. 4F). The small plates having the mirrors, saturable absorber, active laser medium, OPO crystal and optionally microlenses are cut with a diamond saw of the type used in microelectronics for cutting Si chips, so as to obtain laser chips with a cross-section of a few mm$^2$.

In order to obtain a structure, e.g. according to FIG. 1, the expert will be able to adapt the order of the above stages, it also being necessary to produce a supplementary mirror. For a structure like that described in conjunction with FIG. 3, it is necessary to adapt the spectral characteristics of the intermediate mirror 42, as has been explained hereinbefore.

Figure 5:
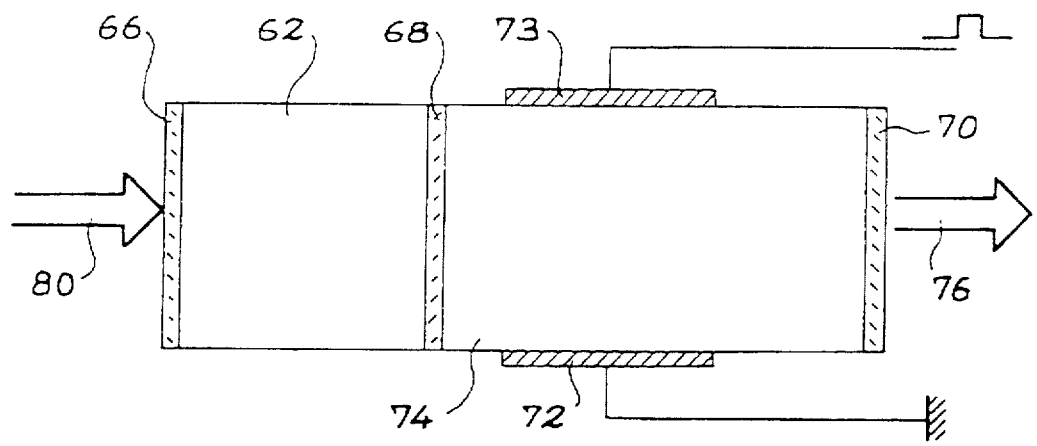
FIGS. 5 to 11 Actively switched microlasers.

According to another embodiment of the invention the microlaser cavity and microlaser are actively switched. An example of such a microlaser structure is illustrated in FIG. 5 (the OPO cavity not being shown), where the reference 62 designates the active laser medium forming a first resonant cavity between an input mirror 66 and an intermediate mirror 68. A second resonant cavity is formed between the intermediate mirror 68 and the output mirror 70. This second resonant cavity incorporates an element 74, whose optical index can be modulated by an external disturbance. In particular, said material can be an electrooptical material, e.g. constituted by LiTaO$_3$. An external control voltage can be applied to electrodes 72, 73 and the application of said voltage leads to the establishment of an electric field in the material 74 and to a modification of the index of said material. This modification affects the coupling of the two cavities and modifies the reflectivity of the intermediate mirror 68 seen by the active laser medium.

Figure 6:
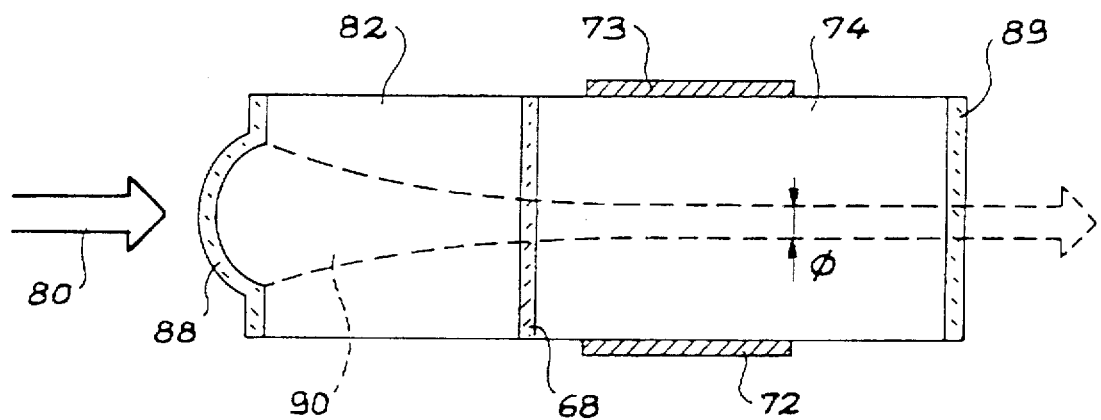
Figure 7:
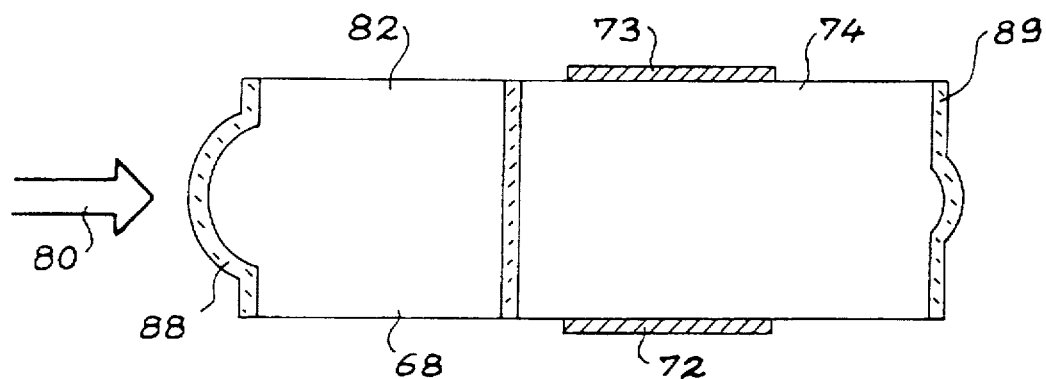

This embodiment can be further improved by adding laser beam size reduction means, which are located at the input of the first resonant cavity, the assembly of the two cavities and the laser beam reduction means being monolithic. This improvement is illustrated in FIGS. 6 and 7, where elements identical or corresponding to those of FIG. 5 are given the same references. The laser beam size reduction means 90 are designated in each case by the reference 88. These means are in fact formed by a micromirror 8 formed on the face of the active laser material 82 to be traversed first by the pumping beam 80.

With this structure it is possible to bring the overall thickness of the microlaser and in particular the thickness of the material 74 down to approximately 100 μm. In the case of an electrooptical material 74, this makes it possible to limit the voltage necessary to be applied between the electrodes 72, 73 to between 50 and 100 V. However, in the embodiment FIG. 5 (all the microlaser mirrors are planar) high voltages of up to several hundred volts or 1000 V must be applied between the electrodes 72, 73 to obtain an adequate index variation to switch the cavity. When the cavity is provided with laser beam size reduction means, the switching threshold of the microlaser is reduced to a few milliwatts.

Preferably, the radius of curvature of the micromirror 88 exceeds the total length of the microlaser (length $L_1$ of the active medium 82+length $L_2$ of the medium 74). Typically, the radius of curvature will exceed approximately 1.5 to 2 mm. With this condition, an optically stable cavity is obtained and a relatively small diameter Φ of the laser beam 90 occurs in the medium 74 and is typically a few dozen micrometers (as opposed to about 120 μm in the embodiment of FIG. 5).

As illustrated in FIG. 7, it is also possible to produce a structure in which a concave micromirror 89 is provided at the output of the second cavity. In addition, the radii $R_1$ and $R_2$ of each of the micromirrors 88, 89 can be chosen so as to obtain two optically stable cavities. This condition is in fact fulfilled for: $R_1 > L_1$ and $R_2 \geq L_2$. The case of the planoconcave cavity of FIG. 6 corresponds to $R_2 = \alpha$.

It is also possible to use as the variable index medium $n_2$ alternatively to the electrooptical element 74:
  either a magnetooptical material whose index $n_2$ is modified in response to an external magnetic field, e.g. with the aid of an electromagnet in the vicinity of said material,
  or a material whose index is a function of temperature or pressure variations imposed from the outside.

The microlaser structures described hereinbefore can be combined with an OPO cavity, as described above in conjunction with FIGS. 2 and 3.

Another actively switched, laser microcavity structure will now be described.

Compared with the structure described above (double Fabry-Perot cavity, FIGS. 5 to 7), the structure of the laser microcavity obtained is much simpler and solves the problem of the complexity of known microlaser structures operating in the active mode. Moreover, the structure obtained makes it possible, like the embodiment described in connection with FIGS. 5 and 6, to reduce the control voltage to be used, when an electrooptical material is employed.

According to this embodiment, the microlaser cavity incorporates an active laser medium and two micromirrors forming a Fabry-Perot cavity, said cavity at the optical stability limit, and means are provided for varying the optical length of the microlaser cavity so as to make it pass from an optically unstable state to an optically stable state.

Thus, a new active switching is implemented, because the optically unstable state is a high loss state of the cavity as opposed to the optically stable state. This structure is radically different from the known structures, because there is now only one Fabry-Perot cavity.

Figure 8:
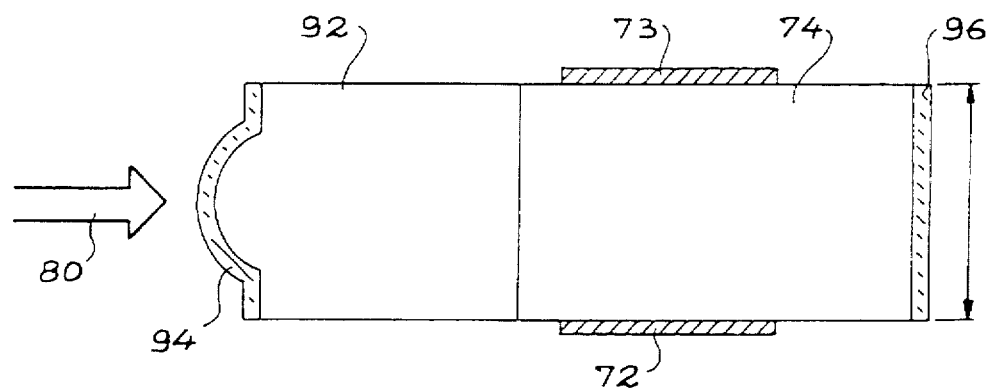
Figure 9:
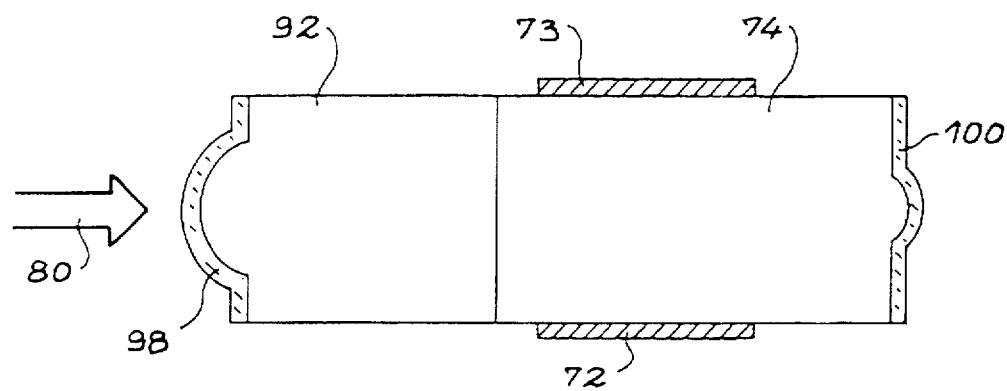

This embodiment is illustrated in FIGS. 8 and 9, where references 72, 73, 74, 80 designate elements identical to those of FIGS. 5 to 7 and which carry the same references. The reference 92 designates the active laser medium, 94 and 98 an input mirror of the laser microcavity and 96, 100 an output mirror of the laser microcavity. The media 92 and 74 can be in contact with one another and an antireflection coating can be deposited at the interface 92-74. The microlaser cavity shown in FIG. 8 is a hemispherical cavity at the stability limit. It constitutes the single cavity obtained with a laser material and another material, whereof it is possible to vary the optical index by an external control voltage. Unlike in the case of the two coupled cavities described in conjunction with FIGS. 5 to 7, these materials form a single Fabry-Perot cavity. The two materials 92 and 74 can be contacted by bonding or molecular adhesion. At the junction of these two materials there can be a limited reflectivity of a few per cent due to optical index differences of the two materials, but this limited reflectivity does not make it possible to obtain an adequate resonance for coupling the two cavities in resonance, as in the systems described in the prior art.

The embodiment of FIG. 9 differs from that of FIG. 8 in that the output mirror 100 is a concave mirror with a radius of curvature $R_2$.

It is necessary to determine the characteristics of the mirror so as to produce a cavity, e.g. confocal (with two concave mirrors as in FIG. 9) or hemispherical (planoconcave, as in FIG. 8) at the stability limit.

In the case of the hemispherical cavity, the stability will be obtained for $R_1 \geq L + (n_1/n_2 - 1)L_2$, with $L = L_1 + L_2$.

In the case of the confocal cavity, the stability is obtained for:

$$R_1 \geq L + (n_1/n_2 - 1)L_2$$
$$R_2 \geq L + (n_2/n_1 - 1)L_1$$

Finally, for the concentric or spherical cavity, the stability condition is:

$$R_1 = R_2 = \frac{n_1 L_2 + n_2 L_1}{n_1 + n_2}$$

In each case, it is possible to vary either the index $n_2$, or the index $n_1$, or one of the lengths $L_1$ or $L_2$ so as to satisfy the corresponding inequation for bring the cavity into a stable state. The variation of one of these parameters is obtained by external control means. As the optically stable state of the cavity corresponds to a low loss state and the optically unstable state to a high loss state, a novel means for actively switching a cavity is provided.

In the case of the embodiments illustrated in FIGS. 8 and 9, the index $n_2$ of the electrooptical medium is modulated by the application of an electric field.

Alternatively in order to modify the optical length of the cavity, it is possible to replace the electrooptical material 74 by:
  a magnetooptical material whose index is modified in response to an external magnetic field, e.g. with the aid of an electromagnet in the vicinity of said material,
  a material whose index $n_2$ is dependent on the pressure, the index variation being obtained by a pressure variation.

Moreover, it is possible to modify the total geometrical length of the cavity by mounting the output mirror on piezoelectric means. This also leads to a controlled variation of the optical length of the microlaser cavity and enables the latter to be passed from an optically unstable state to an optically stable state.

The fact of using a hemispherical, confocal, concentric or spherical cavity permits the concentration of the microlaser beam within the electrooptical material 74 when such a material is used. As the cross-section of the microlaser beam is reduced, it is possible to reduce the thickness of the material of index $n_2$. When use is made of an electrooptical material defining with the laser material a single cavity, it is consequently possible to reduce the necessary distance between the contacting electrodes 72, 73 for obtaining the field E necessary for the modulation of the index $n_2$. The voltage applied to the electrodes to obtain the same field E is reduced by the same amount.

The microlaser structures described hereinbefore can be combined with an OPO cavity, as has been stated hereinbefore in conjunction with FIGS. 2 and 3.

A process for the production of an OPO in accordance with the structure of FIG. 2 with an actively switched microlaser will now be described. This process involves the same stages 1 and 3 to 6 as described in conjunction with FIGS. 4A to 4E for the preparation of an OPO with saturable absorber. The difference is in stage 2, because it is now a question of obtaining active switching in the microlaser.

Figure 10A:
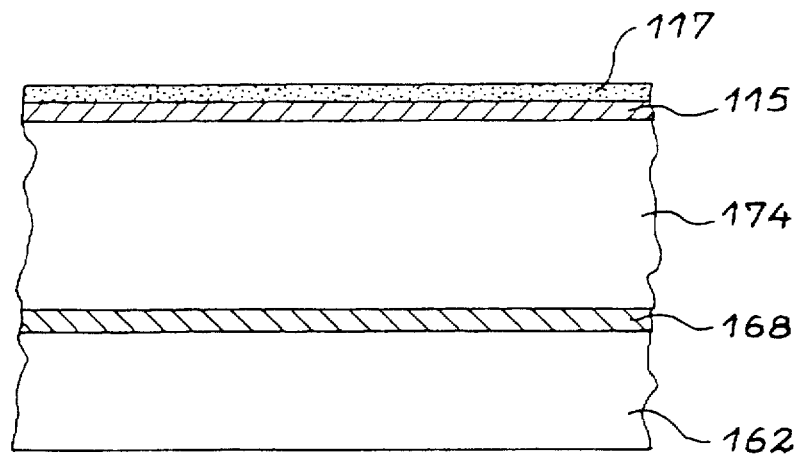
Figure 10B:
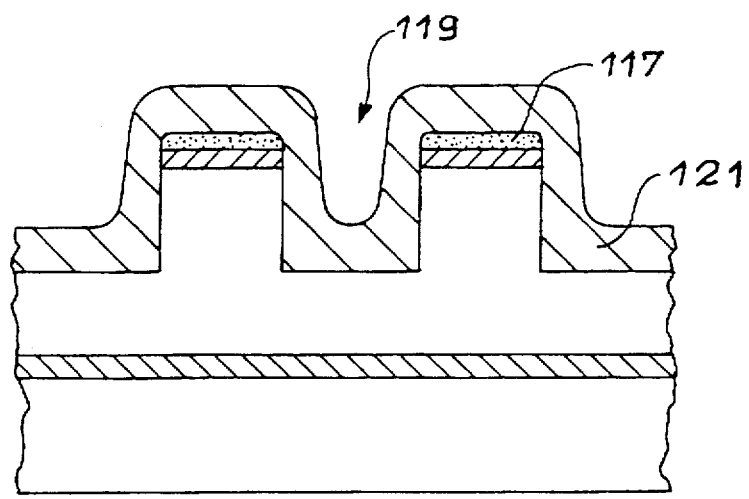

In the case of a microlaser structure with two coupled Fabry-Perot cavities (FIGS. 5 to 7), an intermediate mirror 168 is deposited on the laser material 162 (FIG. 10A), followed by the deposition on said mirror of a plate 174 of a variable index material, e.g. an electrooptical material (LiTaO$_3$). Subsequently, after stage 3 and before stage 4, there are stages 3'-1 to 3'-4 of forming control electrodes 72, 73. 3'-1) The output face 115 of the microlaser is protected by a resin deposit 117. 3'-2) Grooves 119 are made (FIG. 10B) in the electrooptical material with the aid of a diamond saw used in microelectronics so as to be able to subsequently produce electrodes with the desired spacing. 3'-3) This is followed by the deposition of electric contacts by evaporation (e.g. deposition of a Cr—Au coating 121, which envelops the resin 117 and the electrooptical material). 3'-4) This is followed by the chemical etching of the protective resin 117 to leave behind metallizations on either side of the electrooptical material.

In the case of a microlaser with a single Fabry-Perot cavity (FIGS. 8 and 9), the deposit of the intermediate mirror 168 is not produced. An antireflection coating can then be deposited at the interface between the laser material plate and the electrooptical material plate. The two plates are then bonded with the aid of an optical adhesive or assembled by any other process, e.g. molecular adhesion.

When micromirrors have to be formed on one of the faces of the cavity, photolithography is used (exposure of a photosensitive resin using UV radiation through a mask, followed by chemical developing of the resin) and machining by an ion beam.

Figure 11:
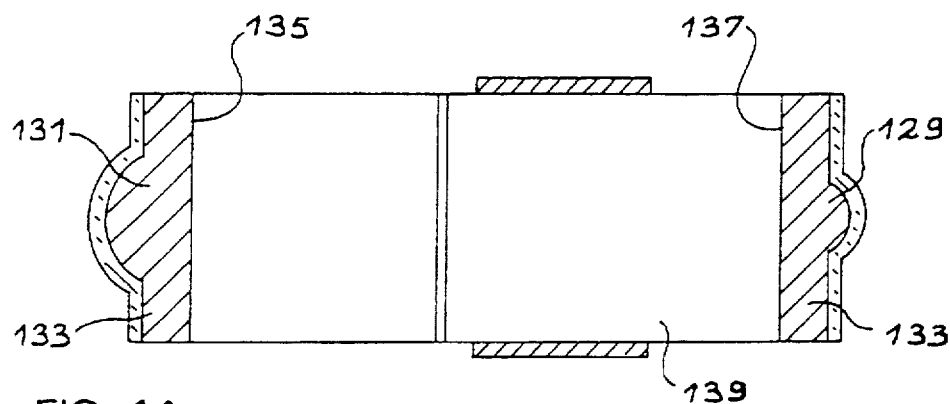

In the two aforementioned active switching cases (double cavity and single cavity), it is possible in a variant to produce micromirrors with a variable density mask. Moreover and as illustrated in FIG. 11, planar or concave micromirrors 129, 131 can be produced on a material 133 such as glass or silica, which is transparent to the wavelength of the laser. These substrates with micromirrors can then be joined to the input face 135 of the laser medium and output face 137 of the electrooptical material 139.

In all the embodiments described hereinbefore, no matter what the switching method and arrangement of the microlaser cavity-OPO cavity, the OPO emission wavelength can be continuously adjusted by varying the temperature of the nonlinear material. A device for controlling the temperature can be operated on the basis of the Peltier effect, as described in "Stabilization and tuning of a doubly resonant OPO", by D. Lee et al. J. Opt. Soc. Am. B. vol. 10, No. 9, Sep. 93, p 1659–1667.

We claim:

1. Optical parametric oscillator, comprising:

an OPO non-linear material and two mirrors positioned on either side of said nonlinear material and forming an OPO cavity, said two mirrors being directly deposited on the OPO non-linear material, a passively switched microlaser for generating a laser beam for pumping said OPO cavity, said microlaser having a cavity incorporating an input mirror and an output mirror, the latter also constituting one of said two mirrors forming said OPO cavity.

2. Optical parametric oscillator according to claim 1, the reflectivities of said mirrors forming said OPO cavity being adjusted to form a doubly or triply resonating cavity.

3. Optical parametric oscillator according to claim 1, said OPO cavity being stabilized.

4. Optical parametric oscillator according to claim 1, the microlaser cavity having a solid active medium and a saturable absorber, the latter being in the form of a thin film of saturable absorber material directly deposited on the solid active medium.

5. Optical parametric oscillator according to claim 4, the film being formed by an organic dye dissolved in a polymer solvent.

6. Optical parametric oscillator according to claim 5, the organic dye being selected from the group consisting of bis(4-diethylaminodithiobenzyl) nickel and bis(4-dimethylaminodithiobenzyl) nickel and the solvent being a solution of polymethyl methacrylate, polyvinyl alcohol, polyvinyl acetate or polystyrene.

7. Optical parametric oscillator according to claim 4, the film being depositable by liquid phase epitaxy.

8. Optical parametric oscillator according to claim 4, the film being formed by a basic material identical to that of the solid active medium and doped with $Cr^{4+}$ or $Er^{3+}$ ions.

9. Optical parametric oscillator, comprising:

an OPO non-linear material and two mirrors positioned on either side of said non-linear material and forming an OPO cavity, said two mirrors forming an input mirror and an output mirror of said OPO cavity and being directly deposited on said OPO non-linear material, a passively switched microlaser for generating a laser beam for pumping said OPO cavity, said microlaser having a microlaser cavity, said input mirror of said OPO cavity being transparent to the wavelength emitted by said microlaser, said OPO nonlinear material being placed in said microlaser cavity.

10. Optical parametric oscillator according to claim 9, the reflectivities of said mirrors forming the OPO cavity being adjusted to form a doubly or triply resonating cavity.

11. Optical parametric oscillator according to claim 9, said OPO cavity being stabilized.

12. Optical parametric oscillator according to claim 9, the microlaser cavity having a solid active medium and a saturable absorber, the latter being in the form of a thin film of saturable absorber material directly deposited on the solid active medium.

13. Optical parametric oscillator according to claim 12, the film being formed by an organic dye dissolved in a polymer solvent.

14. Optical parametric oscillator according to claim 13, the organic dye being selected from the group consisting of bis(4-diethylaminodithiobenzyl) nickel and bis(4-dimethylaminodithiobenzyl) nickel and the solvent being a solution of polymethyl methacrylate, polyvinyl alcohol, polyvinyl acetate or polystyrene.

15. Optical parametric oscillator according to claim 12, the film being depositable by liquid phase epitaxy.

16. Optical parametric oscillator according to claim 15, the film being formed by a basic material identical to that of the solid active medium and doped with $Cr^{4+}$ or $Er^{3+}$ ions.

17. Optical parametric oscillator according to one of the claims 1 or 9, further comprising means for varying the emission wavelength of said OPO non-linear element.

18. Optical parametric oscillator according to claim 17, wherein said means for varying the emission wavelength comprise means for varying the temperature of said OPO non-linear material.

19. Optical parametric oscillator, comprising:
  an OPO non-linear material and two mirrors positioned on either side of said non-linear material and forming an OPO cavity, said two mirrors being directly deposited on the OPO non-linear material,
  an actively switched microlaser for generating a laser beam for pumping said OPO cavity, said microlaser having a cavity incorporating an input mirror and an output mirror, the latter also constituting one of said two mirrors forming said OPO cavity.

20. Optical parametric oscillator according to claim 19, said microlaser comprising a laser active medium forming a first resonant cavity between said input mirror and an intermediate mirror, a second material forming a second resonant cavity between said intermediate mirror and said output mirror, the refractive index of said second material being modulatable by an external disturbance, and laser beam size reduction means being located at the input of said first resonant means being monolithic.

21. Optical parametric oscillator according to claim 20, said reduction means being constituted by a concave mirror produced with a micromirror on the face of the active laser medium intended to be traversed by the microlaser pumping beam.

22. Optical parametric oscillator according to claim 20, said output mirror being a concave mirror produced with a micromirror on an output face of the second material.

23. Optical parametric oscillator according to claim 19, said microlaser comprising a laser active medium and two mirrors forming a Fabry-Perot cavity, which is at the optical stability limit, and means being provided for varying the optical length of the cavity so as to pass it from an optically unstable state to an optically stable state.

24. Optical parametric oscillator according to claim 23, said Fabry-Perot cavity being a hemispherical, confocal, concentric or spherical cavity.

25. Optical parametric oscillator according to claim 23, said cavity incorporating a second variable optical length material.

26. Optical parametric oscillator according to claim 25, said cavity having means for varying the length of said second material.

27. Optical parametric oscillator according to claim 25, the material constituting the laser active medium and said second material having a different refractive index and the cavity having means for varying the refractive index of said second material.

28. Optical parametric oscillator according to claim 25, said second material being an electrooptical material.

29. Optical parametric oscillator according to claim 19, means being provided for varying the OPO emission wavelength.

30. Optical parametric oscillator according to claim 29, the wavelength being adjusted by varying the temperature of the OPO non-linear material.

31. Optical parametric oscillator, comprising:
  an OPO non-linear material and two mirrors positioned on either side of said non-linear material and forming an OPO cavity, said two mirrors forming an input mirror and an output mirror of said OPO cavity and being directly deposited on said OPO non-linear material,
  an actively switched microlaser for generating a laser beam for pumping said OPO cavity, said microlaser having a microlaser cavity, said input mirror of said OPO cavity being transparent to the wavelength emitted by said microlaser, said OPO nonlinear material being placed in said microlaser cavity.

32. Optical parametric oscillator according to claim 31, said microlaser comprising a laser active medium forming a first resonant cavity between said input mirror and an intermediate mirror, a second material forming a second resonant cavity between said intermediate mirror and said output mirror, the refractive index of said second material being modulatable by an external disturbance, and laser beam size reduction means being located at the input of said first resonant cavity, the assembly of said two cavities and of said laser beam size reduction means being monolithic.

33. Optical parametric oscillator according to claim 32, said reduction means being constituted by a concave mirror produced with a micromirror on the face of the active laser medium intended to be traversed by the microlaser pumping beam.

34. Optical parametric oscillator according to claim 32, said output mirror being a concave mirror produced with a micromirror on an output face of the second material.

35. Optical parametric oscillator according to claim 31, said microlaser comprising a laser active medium and two mirrors forming a Fabry-Perot cavity, which is at the optical stability limit, and means being provided for varying the optical length of the cavity so as to pass it from an optically unstable state to an optically stable state.

36. Optical parametric oscillator according to claim 35, said Fabry-Perot cavity being a hemispherical, confocal, concentric or spherical cavity.

37. Optical parametric oscillator according to claim 35, said cavity incorporating a second variable optical length material.

38. Optical parametric oscillator according to claim 37, said cavity having means for varying the length of said second material.

39. Optical parametric oscillator according to claim 37, the material constituting the laser active medium and said second material having a different refractive index and the cavity having means for varying the refractive index of said second material.

40. Optical parametric oscillator according to claim 37, said second material being an electrooptical material.

41. Optical parametric oscillator according to claim 31, means being provided for varying the OPO emission wavelength.

42. Optical parametric oscillator according to claim 41, the wavelength being adjusted by varying the temperature of the OPO non-linear material.

* * * * *